(12) United States Patent
Schollier

(10) Patent No.: US 12,116,726 B2
(45) Date of Patent: Oct. 15, 2024

(54) POLYESTER TRANSPORT CARPET AND METHOD FOR MANUFACTURING A POLYESTER TRANSPORT CARPET

(71) Applicant: DE POORTERE DECO SA, Mouscron (BE)

(72) Inventor: Bert Schollier, Mouscron (BE)

(73) Assignee: DE POORTERE DECO SA, Mouscron (BE)

( * ) Notice: Subject to any disclaimer, the term of this patent is extended or adjusted under 35 U.S.C. 154(b) by 69 days.

(21) Appl. No.: 17/754,861

(22) PCT Filed: Oct. 16, 2020

(86) PCT No.: PCT/EP2020/079237
§ 371 (c)(1),
(2) Date: Apr. 14, 2022

(87) PCT Pub. No.: WO2021/074394
PCT Pub. Date: Apr. 22, 2021

(65) Prior Publication Data
US 2024/0093429 A1 Mar. 21, 2024

(30) Foreign Application Priority Data
Oct. 17, 2019 (BE) .................................. 2019/5715

(51) Int. Cl.
*B32B 5/26* (2006.01)
*B32B 5/02* (2006.01)
(Continued)

(52) U.S. Cl.
CPC ........... *D06N 7/0081* (2013.01); *B32B 5/022* (2013.01); *B32B 5/024* (2013.01); *B32B 5/26* (2013.01);
(Continued)

(58) Field of Classification Search
CPC ...................................................... B32B 5/275
See application file for complete search history.

(56) References Cited

U.S. PATENT DOCUMENTS 3,719,546 A * 3/1973 Parlin ...................... B32B 5/26
442/100
2003/0031825 A1* 2/2003 Barkis .................... D03D 27/00
428/95

(Continued)

FOREIGN PATENT DOCUMENTS

EP 1533114 A2 5/2005
EP 3192906 A1 7/2017
(Continued)

OTHER PUBLICATIONS

ISR-WO dated Nov. 30, 2020 for parent application PCT/EP2020/079237 (with ISR translation).

*Primary Examiner* — Andrew T Piziali
(74) *Attorney, Agent, or Firm* — Vorys, Sater, Seymour and Pease LLP

(57) ABSTRACT

The present invention relates to a flame-retardant carpet suitable for the interior of means of transport, preferably aircraft, comprising a machine-woven or mechanically woven carpet, comprising warp and weft threads, a needle felt, an intermediate layer between the needle felt and the machine-woven or mechanically woven fabric, in which a part of the warp threads on the rear side of the machine-woven or mechanically woven fabric have at least partially fused to each other. The invention also relates to a method for the manufacture of a flame-retardant carpet suitable for the interior of means of transport, in particular aircraft.

14 Claims, 1 Drawing Sheet

(51) Int. Cl.
*B32B 7/09* (2019.01)
*B32B 7/12* (2006.01)
*D06N 7/00* (2006.01)

(52) U.S. Cl.
CPC ............ *B32B 7/09* (2019.01); *B32B 7/12* (2013.01); *B32B 2250/02* (2013.01); *B32B 2250/20* (2013.01); *B32B 2262/02* (2013.01); *B32B 2307/3065* (2013.01); *B32B 2307/718* (2013.01); *B32B 2471/02* (2013.01); *B32B 2605/18* (2013.01); *D06N 2209/067* (2013.01); *D06N 2211/267* (2013.01)

(56) References Cited

U.S. PATENT DOCUMENTS

| | | | |
|---|---|---|---|
| 2005/0255775 A1* | 11/2005 | Sultan | B32B 17/04 442/212 |
| 2006/0240217 A1 | 10/2006 | Foss | |
| 2009/0233040 A1 | 9/2009 | Baumgartner | |
| 2010/0000623 A1* | 1/2010 | Makida | D04B 21/02 66/194 |
| 2013/0302556 A1* | 11/2013 | Vogel | D06N 7/0068 156/72 |
| 2016/0326401 A1* | 11/2016 | Ikebata | C09J 7/22 |
| 2021/0372042 A1* | 12/2021 | Kniss | D06N 7/0063 |

FOREIGN PATENT DOCUMENTS

| | | |
|---|---|---|
| EP | 3196344 A1 | 7/2017 |
| EP | 3199678 A1 | 8/2017 |
| JP | 2000-282347 A | 10/2000 |
| JP | 2000-308604 A | 11/2000 |
| JP | 2005-152159 A | 6/2005 |
| JP | 2012-097373 A | 5/2012 |
| WO | 2005/113229 A2 | 1/2005 |
| WO | 2007/112608 A1 | 11/2007 |
| WO | 2012/076348 A2 | 6/2012 |
| WO | 2015/014335 A1 | 2/2015 |
| WO | 2017/137409 A1 | 8/2017 |
| WO | 2021/074394 A1 | 4/2021 |

* cited by examiner

POLYESTER TRANSPORT CARPET AND METHOD FOR MANUFACTURING A POLYESTER TRANSPORT CARPET

TECHNICAL AREA

The invention relates to a flame-retardant carpet suitable for use in the interior of means of transport, preferably aircraft.

In a second aspect, the invention also relates to a method for the manufacture of a flame-retardant carpet suitable for the interior of means of transport, preferably aircraft.

STATE OF THE ART

Carpets are part of the usual equipment of the interior of aircraft, but also of any other means of transport such as trains or ships. In addition to the floor, parts of the interior walls of aircraft are often also fitted with carpets. Carpets in aircraft are subject to very strict requirements. In particular, they must be flame retardant and in the event of a fire, the development of toxic fumes and vapours must not exceed the strict requirements. In general, corresponding standards are legally required. Particularly in the case of airliners, only carpets may be used that also meet the standards, e.g. ABD 0031 regarding the development of toxic fumes and vapours, FAR 25.853 regarding flammability and ISO 6356 regarding the tendency of textile and laminate floor coverings to form static electricity.

In addition to these strict standards, airlines expect the carpets in the planes to be very resistant to wear and tear. Every day, many passengers walk and roll with their trolleys on the carpet. This is a heavy load that the carpet must withstand. The mats in the aircraft are therefore replaced regularly.

Also, the carpet must have a light weight per unit area to reduce the fuel consumption of an aircraft. In an aircraft, there are many square meters of carpet. A reduction in the weight per unit area of carpet results in significant savings for airlines every year.

Such a device is known, among other things, from WO 2007/112608, in which a flame-retardant carpet for aircraft interiors is described. The carpet comprises a woven top layer, needle felt as a bottom layer and an intermediate layer for laminating the two layers together. It is a light weight carpet per unit area that can be quickly installed in an aircraft using Velcro strips.

The device of WO 2015/014335 is also known. WO 2015/014335 relates to a textile floor covering, in particular for use in aircraft interiors. The carpet comprises an upper layer, which may be a pile fabric, a smooth fabric or a tufted carpet, needle felt as a lower layer and an intermediate layer for laminating the two layers together. Underneath the needle felt, an acrylic latex is applied. This acrylic latex layer prevents the carpet from slipping, so that it can be installed in the aircraft without the use of Velcro, glue or double-sided tape.

JP 2000 308604 describes a base fabric for a dust control carpet.

JP 2000 282347 describes a pile carpet.

JP 2005 152159 describes a woven carpet.

WO 2005/113229 describes a hybrid of vinyl flooring and soft padded carpet.

EP 3 192 906 describes a fray-resistant carpet with fusible threads.

WO 2012/076348 describes a process for manufacturing a textile product and the resulting textile product.

EP 3 196 344 describes a fray-resistant carpet with natural yarns.

WO 2007/112608 has the disadvantage that the top layer is a lightweight fabric. As a result, the fabric itself is not sufficiently resistant to the heavy loads of everyday passengers and trolleys and does not have sufficient dimensional stability. The fabric is reinforced by applying a polyacrylate glue as an intermediate layer between the fabric and the needle felt. The glue laminates the fabric to the needle felt, but also keeps the connections between the growing warp and weft threads together. This requires that the glue partially mixes with the warp and weft threads. The intermediate layer adds to the weight of the carpet. In addition, the intermediate layer makes it difficult to recycle the carpet because the fabric threads and the needle felt can hardly be separated from the intermediate layer. This is a major disadvantage in view of the frequent replacement of carpets in aircraft.

WO 2015/014335 has similar disadvantages. In the case where a tufted carpet or pile fabric is used, the top layer itself is stronger and has more dimensional stability, but both are heavier than a smooth fabric, which can then be disadvantageous. In addition, a tufted carpet or pile fabric is less suitable for rolling with trolleys and is more susceptible to wear. When using a smooth fabric, it is again necessary to keep the connections between the warp and weft threads growing together. WO 2015/014335 uses fusion lamination to bond the top layer and the needle felt and keep the warp and weft threads together at the same time. This again leads to an increase in weight and makes it difficult to recycle the top layer and the needle felt.

The present invention aims to provide a solution to these drawbacks.

SUMMARY OF THE INVENTION

In a first aspect, the present invention relates to a device according to claim 1.

The advantage of such a carpet is that some of the warp threads on the back side of the machine-woven or mechanically woven fabric have at least partially fused to each other. Therefore, the fabric itself is already quite strong and has good dimensional stability. It will not be torn off so quickly by the loads of passengers and trolleys. The warp threads and therefore also the weft threads have a limited freedom of movement in relation to each other, which increases the wear resistance.

Because the fabric is already reinforced by the fusion joints, there is no need to use a heavy intermediate layer to reinforce the fabric and to laminate the fabric and needle felt. A lighter intermediate layer can be used to laminate only the fabric and the needle felt. This leads to a reduction in weight per unit area for the carpet. Since the glue does not have to be partially mixed with the warp and weft threads, it is easier to separate and recycle the fabric and needle felt.

In addition, the invention uses 100% thermoplastic flame retardant polyester (PES) for both the fabric and the needle felt. Consequently, the carpet meets the required standards regarding for example ABD 0031 for the development of toxic fumes and vapours and FAR 25.853 regarding flammability. An additional advantage is that, due to the use of only flame-retardant polyester (PES), the recycling of the fabric and the needle felt is carried out simultaneously.

Preferred embodiments of the device are described in claims 2 to 9.

In a specific embodiment, the invention relates to a device according to claim 7. In the intermediate layer, PES is also used as an adhesive to laminate the fabric and the needle felt. This improves recycling even more. Now it is not even necessary to separate the fabric and the needle felt. The middle layer can even be processed and recycled together with the fabric and needle felt.

In a second aspect, the present invention relates to a method according to claim 10. Because, before the fabric and the needle felt are laminated, the fabric is led along a heated surface to at least partially melt a part of the warp threads at the back side of the mutually machine-woven or mechanically woven fabric, said method has among others the advantage that a fabric is obtained which is sufficiently strong and has dimensional stability. The fabric can be laminated to the needle felt with a light intermediate layer and the fabric and needle felt can easily be separated later for recycling.

Preferred embodiments of the device are described in dependent claims 11 to 13.

In a third aspect, the present invention relates to the manufacture of a carpet according to the first aspect, using a method according to the second aspect.

DETAILED DESCRIPTION

Figure 1:
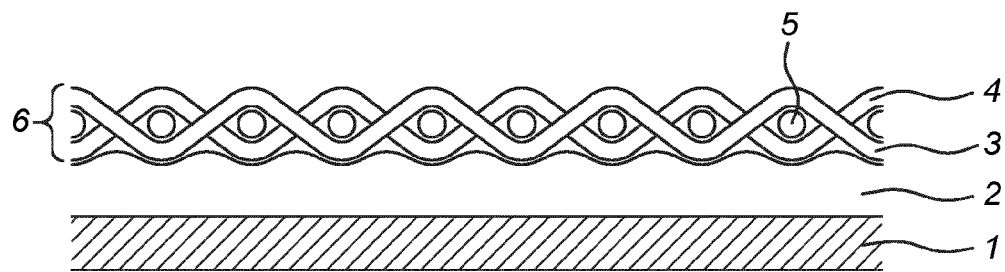
FIG. 1 shows a section of an embodiment of the present invention.

Unless otherwise stated, all terms used in the description of the invention, including technical and scientific terms, are used in the sense as generally understood by those skilled in the technical field of the invention. For a better judgment of the description of the invention, the following terms are explicitly explained.

"A", "one" and "the" refer in this document to both singular and plural unless the context clearly implies otherwise. "A segment" means, for example, one or more than one segment.

When "about" or "approximately" is used in this document, a measurable quantity, parameter, time or moment etc. means variations of +/−20% or less, preferably +/−10% or less, more preferably +/−5% or less, even more preferably +/−1% or less, and even more preferably +/−0.1% or less of the quoted value, as long as such variations apply to the above invention. However, the value of the quantity with which the term "about" or "approximately" is used, must itself be specifically expressed.

The terms "comprise", "contain", "include", "composed of", "provided for", "comprising", "containing", "including" are synonyms and are inclusive or open-ended terms indicating the presence of the following, and not excluding or precluding other components, features, elements, members, phases, known to or described in the prior art.

Quoting numerical intervals by means of endpoints includes all integers, fractions and/or real numbers between the endpoints, including these endpoints.

The term "thermoplastic" refers to a polymeric material that can be bent, kneaded or liquefied above a specific temperature and which substantially hardens after cooling. Examples of thermoplastic polymers include, but are not limited to, vinyl comprising thermoplastics: such as polyvinyl chloride, polyvinyl acetate, polyvinyl alcohol and other vinyl and vinylidene resins and copolymers thereof; polyethylene compounds: such as low density polyethylene and high density polyethylene and copolymers thereof; styrene compounds: such as ABS, SAN and polystyrenes and its copolymers, polypropylene and its copolymers; saturated and unsaturated polyesters; acrylic; polyamides; engineering plastics such as acetyl, polycarbonate, polyimide, polysulfon, polyphenylene oxide and sulfide resins and others.

The term "float" refers to a section of yarn appearing on the surface of a fabric. Floats may be upper floats and/or lower floats. The term "top float" refers to a section of yarn appearing above a fabric. A top float is formed by a bonding pattern with a warp:weft bonding density of 2:1, 3:1, 4:1, 5:1, 6:1, 7:1, 8:1, 9:1, 10:1 or more. This means that each weft thread floats over at least two warp threads, over at least 3 warp threads, etc. Alternatively, each warp thread floats above at least two weft threads, above at least 3 weft threads, etc. The term "bottom float" refers to a section of yarn appearing underneath a fabric. A bottom float is formed by a bonding pattern with a warp:weft bond density of 1:2, 1:3, 1:4, 1:5, 1:6, 1:7, 1:8, 1:9, 1:10 or less. This means that each weft yarn floats below at least two warp yarns, below at least 3 warp yarns, etc. Alternatively, each warp thread floats under at least two weft threads, under at least 3 weft threads, etc. The term "binding" is used to refer to the weaving of weft threads with warp threads to form a fabric.

The term "weft float" refers to a float formed by weft threads. The term "warp float" refers to a float formed by warp threads.

The yarn number refers to the thickness of the yarn. The measurement is indicated as the ratio between the weight and the length of a piece of yarn. In weight numbering, the weight of a fixed length of yarn is determined. In length numbering, the length of a fixed yarn weight is determined. Tex is an example of weight numbering, where tex indicates the weight in grams of 1000 m of yarn. Dtx is used more often, which is the weight in grams of 10,000 m of yarn. Another example of weight numbering is denier, denoted den, in which the weight in grams of 9000 m of yarn is indicated. For yarns comprising filaments, denier weight numbering is also used for filaments. Last per filament or DPF refers to the weight number of one filament in the yarn.

In a first aspect, the invention relates to a flame-retardant carpet suitable for use in the interior of means of transport, in particular aircraft.

According to an embodiment, the device comprises a machine or mechanically woven fabric with a weight of maximum 650 g/m$^2$, comprising a front side as a use surface and a back side, comprising warp and weft yarns of essentially 100% thermoplastic flame retardant polyester (PES), a needle felt with a weight of at most 220 g/m$^2$ of essentially 100% thermoplastic flame-retardant polyester (PES), an intermediate layer between the needle felt and the machine- or mechanically woven fabric with a weight of at most 180 g/m$^2$, wherein some of the warp threads on the rear side of the machine- or mechanically woven fabric have at least partially fused to one another.

The fabric consists of a front and a back side. The front side is the use surface on which passengers walk and roll with their trolleys and luggage. After installation, it is the visible part of the carpet.

A fabric has the advantage over a tufted carpet that a base, such as a fabric or needle felt, is not required, whereby a pile thread is pierced. By the absence of a base in a fabric, the weight can be reduced compared to tufted carpet. In addition, tufted mats are often long-pile, which makes it difficult to roll with trolleys and suitcases. In addition, such long-pile mats wear out more quickly.

The fabric should preferably be smooth. A pile fabric has the same disadvantage as a long pile tufted carpet when using trolleys and suitcases. A pile fabric will wear out again more quickly. A second disadvantage of pile fabrics is that besides the pile yarn that is used to form the pile, the warp yarn also includes additional threads to bind the pile. As a result, the fabric becomes heavier compared to a smooth fabric.

The fabric preferably has a smooth bond. In a smooth bond, each weft thread extends alternately above and below a warp thread and each warp thread extends alternately above and below a weft thread. This is the simplest and strongest possible connection. The heavy daily loading of the fabric by passengers and trolleys can pull the warp and weft threads apart and reduce the dimensional stability. A strong bond is advantageous to combat this. In addition, a strong bond will ensure that the warp and weft threads will be less mobile in relation to each other under the influence of the load of passengers and trolleys, so that there is less friction between the threads and therefore less wear. This has no influence on the wear of the wires due to friction with e.g. passengers' shoes and trolley wheels.

In another embodiment, the bond in the fabric is a weft thread. Each weft thread extends alternately over and under two juxtaposed warp threads and each warp thread alternately over and under a weft thread. This offers a different visual effect than with a smooth bond. Because the weft thread only runs above or below two juxtaposed warp threads in a weft loop, this is still a strong bond.

The fabric preferably has a limited number of floats, both upper and lower floats. Floats can be used in combination with different coloured yarns to weave patterns, emblems or indications into the fabric. The disadvantage of using floats is that it introduces a deviation from a smooth bond and therefore weakens the bond in the fabric locally. Floats preferably have a bond density of less than or equal to 7:1 and greater than or equal to 1:7, more preferably a bond density of less than or equal to 5:1 and greater than or equal to 1:5, and even more preferably less than or equal to 2:1 and greater than or equal to 1:2.

In one embodiment, the fabric is a Jacquard fabric. A Jacquard fabric comprises complex patterns and/or emblems which cannot be woven with frames on a weaving machine. Weaving with frames means that all the warp threads that are passed through a single frame, are located at each weft thread in the fabric either all at one side or all at the other side of the weft thread. A Jacquard fabric is woven using a Jacquard weaving machine. Jacquard allows an individual warp thread to be in a position on one side or the other of the weft thread, independent of the position of the other warp threads.

The fabric consists of warp and weft yarns of essentially 100% thermoplastic flame retardant polyester (PES). PES is very strong, is rigid, has good dimensional stability and low creep. It is therefore suitable for use under high load. The yarn is not attacked by mould and bacteria. This is advantageous because in an aircraft, liquids and food can be spilled, which can lead to mould and bacteria. PES absorbs almost no liquids. It is well resistant to acids, oxidising agents and diluted alkaline detergents. It can be sterilised with steam. Thanks to these characteristics, the fabric is suitable for efficient and quick cleaning, which is also advantageous for a carpet in an aircraft.

Flame retardant PES has excellent heat resistance. It is hardly flammable, extinguishes flames and results in limited smoke development. Thanks to these characteristics, it is possible to comply with ABD 0031 regarding the development of toxic fumes and vapours and FAR 25.853 regarding flammability.

The carpet also includes a needle felt of essentially 100% thermoplastic flame retardant polyester (PES). Therefore, the needle felt meets the ABD 0031 standard for the development of toxic fumes and vapours and the FAR 25.853 standard for flammability. Needle felt is a non-woven textile. The needle felt has a thickness of 0.5 mm to 4 mm, preferably 0.5 mm to 3 mm, more preferably 0.5 mm to 2 mm and even more preferably 0.5 mm to 1 mm.

The needle felt is attached to the back of the fabric with the aid of the intermediate layer. The needle felt is suitable for mechanically reinforcing the fabric. It is suitable to provide stiffness to the carpet at sharp edges, to give the carpet high dimensional stability, to increase the comfort of walking on the carpet and to improve the sound insulation and thus the acoustics inside an aircraft.

Because needle felt is a non-woven textile, the carpet is suitable for quick installation and replacement in an aircraft. The carpet is attached to the aircraft floor with Velcro strips. The Velcro strips are adhered to the floor of the aircraft. The hooks of the Velcro strips are hooked into the threads of the needle felt, so that the carpet is immobilised. The carpet can easily be removed by pulling the carpet off the Velcro strips. The Velcro strips are reusable and remain adhered to the aircraft floor. A new carpet according to the invention can easily be installed by adhering the new carpet to the existing Velcro strips, so that the new carpet is immobilised.

A Velcro tape is made of a flame retardant material and meets the FAR 25.853 (a)(1)(ii) standard for flammability. A non-limited advantage of a suitable material is polyamide PA6. The weight is preferably less than 0.60 kg/m$^2$, more preferably less than 0.55 kg/m$^2$ and even more preferably less than 0.45 kg/m$^2$. The Velcro strips comprise hooks on one side of the strip, configured to hook the threads, and on the opposite side, an adhesive. The adhesive has a bond strength of at least 10.0 N/cm to aluminium, preferably at least 12.0 N/cm to aluminium and even more preferably at least 13.0 N/cm to aluminium. The force required to pull the carpet off the hooks of the Velcro tape is at least 0.60 N/cm, preferably at least 0.70 N/cm and even more preferably at least 0.80 N/cm. The shear force of the Velcro tape is at least 20 N/cm$^2$, preferably at least 25 N/cm$^2$ and even more preferably at least 29 N/cm$^2$. The loop tension is at least 5 N/cm$^2$, preferably at least 7 N/cm$^2$ and even more preferably at least 8 N/cm$^2$. A non-limited example of a suitable Velcro tape is HTH 577 from the company Velcro.

The fabric has a maximum weight of 650 g/m$^2$. The needle felt has a weight of maximum 220 g/m$^2$. The middle layer weighs a maximum of 180 g/m$^2$. The total weight of a carpet is therefore a maximum of 1050 g/m$^2$. A standard carpet can weigh up to 2000 g/m$^2$ and even 3000 g/m$^2$. This makes a carpet according to the invention particularly suitable for application in an aircraft, where a reduction in weight results in a reduction in fuel consumption.

Some of the warp threads of the machine-woven or mechanically woven fabric have at least partially melted together on the back side. A warp thread has preferably melted over at least 10% of its length, more preferably over at least 20% of its length, even more preferably over at least 30% and even more preferably over at least 50% of its length of the juxtaposed warp threads. Because some of the warp threads have fused to each other, the warp threads are movable relative to each other to a limited extent. This increases the dimensional stability and reduces friction between the threads, which in turn reduces wear. This strengthens the fabric and the carpet. In the case of carpets according to the state of the art, the fabric is reinforced by applying a layer of adhesive or a fusion coating adhering to the knots of the fabric. The glue or fused coating must then penetrate between the threads of the fabric, so that more glue or fused coating is needed than simply to attach the fabric to the needle felt. In the case of a carpet according to the invention, there is therefore an additional weight reduction compared to the state of the art. A further advantage is that it is not necessary for the glue or fusion coating to penetrate between the threads, so that it is easier to recycle the fabric threads and the needle felt.

According to an embodiment, the thread number of the warp and weft threads is 1100 dtex to 4400 dtex.

A higher yarn number means a heavier and thicker yarn. A high yarn number is indicated for heavy, strong fabrics with high dimensional stability. A low thread number is indicated for light and soft fabrics. A transport carpet is preferably light, strong and holds its shape under the daily load of passengers and trolleys. A yarn number of 1100 dtex to 4400 dtex, preferably 1500 dtex to 3700 dtex and even more preferably 1800 dtex to 3100 dtex is suitable for a transport carpet. The belt is then sufficiently light and strong.

The weft and warp threads comprise filaments. To obtain a lightweight fabric, lightweight filaments are indicated. The filament has a weight number of 2 DPF to 20 DPF, preferably 2 DPF to 15 DPF, more preferably 2 DPF to 10 DPF and even more preferably 2 DPF to 5 DPF.

In an alternative embodiment, it is necessary to make the fabric stronger to achieve sufficient dimensional stability. In this case, slightly stronger filaments are indicated. The filament has a weight number of 2 DPF to 20 DPF, preferably 5 DPF to 20 DPF, more preferably 8 DPF to 20 DPF and even more preferably 10 DPF to 20 DPF.

According to one embodiment, weft and warp threads are so-called continuous filament threads and the threads comprise continuous filaments.

According to one embodiment, the weft and warp yarns are so-called continuous filament yarns and the yarns comprise continuous filaments, wherein the texture of the yarns is modified by means of air jets, in which small loops are formed. This provides extra insulation and strength.

In one embodiment, the number of warp threads per cm of fabric is 8 to 30.

The number of warp threads per cm of fabric also determines the density of the fabric. A denser fabric will be stronger and have more dimensional stability, but it will also be heavier. With a lower number of warp threads per cm of fabric, the fabric is lighter and softer, but will be less strong and have less dimensional stability. The number of warp threads per cm of fabric is 8 to 30, preferably 13 to 25, even more preferably 15 to 20. The carpet is then sufficiently light and strong.

In one embodiment, the number of weft threads per cm of fabric is 3 to 10.

The number of weft threads per cm of fabric also determines the density of the fabric. A denser fabric will be stronger and have more dimensional stability, but it will also be heavier. In case of a lower number of weft threads per cm of fabric, the fabric is lighter and softer, but it will be less strong and have less dimensional stability. The number of weft threads per cm of fabric is 3 to 10, preferably 3 to 8, even more preferably 3 to 7. The carpet is then sufficiently light and strong.

In one embodiment, the weight per unit area of the carpet is a maximum of 950 $g/m^2$.

The weight of the carpet is determined by the weight of the fabric, the middle layer and the needle felt. The weight of the carpet can be optimised by careful selection of the fabric, the middle layer and the needle felt. A heavier fabric is inherently stronger and requires a thinner needle felt for good dimensional stability. Because some of the warp threads of the mechanically woven fabric have at least partially fused to each other on the back side, the intermediate layer is minimal. The intermediate layer is the connection between the fabric and the needle felt. A lighter fabric requires a slightly thicker needle felt for good dimensional stability. The middle layer can always be minimal. With a good choice of fabric thickness, determined by the thread number, the number of warp threads per cm of fabric and the number of weft threads per cm of fabric, and a suitable needle felt, the weight of the carpet is a maximum of 950 $g/cm^2$, preferably a maximum of 925 $g/cm^2$, even more preferably a maximum of 900 $g/cm^2$ and even more preferably 875 $g/cm^2$.

In one embodiment, the machine-woven or mechanically woven fabric and the needle felt are laminated to each other with the aid of the intermediate layer.

Machine-woven or mechanically woven fabric and needle felt are bonded together. The needle felt provides dimensional stability and strengthens the fabric because it is bonded to the fabric. The fabric and the needle felt are laminated to each other with the aid of the intermediate layer.

In one embodiment, the intermediate layer comprises the PES adhesive.

Thanks to the use of PES as an adhesive, the transport carpet can be easily recycled. Both the fabric, the needle felt and the adhesive in the middle layer contain PES, so that the whole carpet can be recycled together. There is no need to separate the fabric and needle felt. The PES adhesive is for example a PES fusion adhesive film, PES fusion powder or other suitable means.

In one embodiment, the carpet comprises reactive molecules to form thermoreversible covalent interactions in the interlayer.

In this way, covalent interactions can be reversed by heating the carpet. This contributes to a simple recycling of the carpet. By reversing the reaction between the reactive molecules, the original bonding structure in the intermediate layer, binding the fabric and the needle felt, is broken down into smaller molecules. These smaller molecules can be more easily removed from the fabric and needle felt than a traditional glue or fusion coating. For example, it is possible to dissolve the remaining smaller molecules in a mild solvent and then recover these molecules from the solvent. Another possibility is to recycle the molecules together with the fabric and/or needle felt, for example by mixing the molecules with the threads of the fabric and/or needle felt filament.

Thermoreversible covalent reactions are already known to chemistry. A non-exhaustive list of examples are Michael reactions, nitroso dimerisation reactions, cyclic anhydride reactions in which ester compounds are composed, urethane formation reactions, aliphatic ion formation reactions and phenol-azlactone adduct formation reactions.

According to another embodiment, the reaction is between a first molecule, comprising a conjugated diene group and a second molecule comprising a dienophyl group. Such reactions between a conjugated diene group and a dienophyl group are referred to as Diels-Alder reactions.

The advantage of Diels-Alder reactions is that thermal reversibility can occur at relatively low temperatures. This can prevent possible physical and chemical damage to the fabric and needle felt.

A conjugated diene is an acyclic hydrogen with a molecular structure comprising two hydrogen-hydrogen double compounds, separated by a single compound. The conjugated diene group may be part of a molecule comprising atoms other than carbon and hydrogen. A dienophyl is the alkene component (double compound of carbon) of a reaction between an alkene and a diene. The dienophyl group can be part of a molecule containing atoms other than carbon and hydrogen.

According to another embodiment, the diene group is a furan (such as furfuryl), anthracene, thiophene or pyrrole. The dienophyl group is a maleimide, fumarate, maleate or alkylene. These groups are suitable for use in the invention. Clearly, this embodiment does not preclude the use of other diene groups and/or dienophyl groups.

In one embodiment, some of the weft yarns on the back side of the machine-woven or mechanically woven fabric have at least partially merged with some of the warp yarns.

Because some of the weft threads have merged with the warp threads, the weft and warp threads can move relative to each other to a limited extent. Some of the nodes of the weft and warp threads are therefore fixed. This increases the dimensional stability and reduces the friction between the threads and thus the wear. This strengthens the fabric and the carpet. In the case of carpets according to the state of the art, the fabric is reinforced by applying a layer of adhesive or a fusion coating adhering to the knots of the fabric. The glue or fused coating must then penetrate between the threads of the fabric, so that more glue or fused coating is needed than simply to attach the fabric to the needle felt. In the case of a carpet according to the invention, there is therefore an additional weight reduction compared to the state of the art. A further advantage is that it is not necessary for the glue or fusion coating to penetrate between the threads, so that it is easier to recycle the fabric threads and the needle felt.

In a second aspect, the invention relates to a method for the manufacture of a flame-retardant carpet suitable for the interior of means of transport, in particular aircraft.

According to one embodiment, the method comprises the steps of machine weaving a fabric, comprising a front side as a use surface and a back side, comprising warp and weft yarns of substantially 100% thermoplastic flame retardant polyester (PES), making a needle felt of substantially 100% thermoplastic flame retardant polyester (PES), and laminating the needle felt to the fabric with the aid of an intermediate layer, wherein the method comprises the additional step prior to lamination of leading the backside of the fabric along a heated surface to at least partially melt some of the warp threads on the backside of the machine-woven or mechanically woven fabric.

The fabric preferably has a maximum weight of 650 g/m². The needle felt has a maximum weight of 220 g/m². The middle layer has a maximum weight of 180 g/m².

The machine weaving or mechanical weaving of fabrics using a loom is known in the state of the art.

The formation of a needle felt from filaments is known in the state of the art. This can be done in two ways: a continuous method and a discontinuous method. In the case of the continuous method, filaments are formed directly in an uninterrupted process by extrusion from grains, a needle felt is formed and filaments are bound into the needle felt. In the case of the discontinuous method, the filament yarns are fed to a needle felt machine from spools. There, the filament yarns are opened, formed into the desired shape of needle felt and then bound. Preferably, a mechanical method is used for binding the filaments into the needle felt. An example is the needling of the needle felt with needles with barbs. By needling, the filaments are mixed, but there are also still many loose filament ends or loops that can get caught in the hooks of the Velcro tape when attaching to the aircraft floor. Chemical reinforcement of needle felt is less preferred as it may influence the recycling of needle felt. Thermal reinforcement of the needle felt can reduce the number of loops or loose filament ends that can be caught by the hooks of a Velcro tape.

The needle felt is laminated to the fabric. For the lamination phase, the back side of the fabric is directed through a heated surface to at least partially melt some of the warp threads to each other. The fabric is directed through a series of support rollers. Between two support rollers there is a heated surface. The heated surface pushes against the back side of the fabric. The heated surface is preferably adjustable so that it can push more or less against the back side of the fabric. The back side here indicates a side of the fabric and not the position of the heated surface relative to the fabric. The heated surface can be positioned horizontally or vertically, above, below, to the left or right, in front of or under the fabric. It is clear to the person skilled in the art how the arrangement of the support rollers and the orientation of the fabric must be adapted so that the heated surface pushes against the back of the fabric.

In one embodiment, the heated surface is a hot plate, a hot roller, a metal sheet with a tip, another suitable surface or a combination of the above.

Because the fabric is led with its backside through the heated surface, some of the warp threads melt at least partially to each other. By pushing the heated surface more or less against the warp threads, the degree of melting of the warp threads can be changed. Other influencing parameters are the temperature of the heated surface and the speed with which the fabric is directed through the heated body.

The fabric can be directed through one, two, three or more heated bodies, depending on the desired degree to which some of the warp threads have fused together.

In one embodiment, on the other side of the fabric, facing the heated body, an additional support roller can be positioned. This support roller supports the fabric while the heated body pushes against the back side of the fabric. By using a support roller facing the heated body, it is possible to push the heated surface more strongly against the fabric without the fabric tearing.

In one embodiment, the lamination comprises the use of PES as an adhesive in the intermediate layer.

In one embodiment, a PES melt-adhesive film is used during lamination. The fabric is unwound from a first roll, the PES fusion self-adhesive film from a second roll and the needle felt from a third roll. The fabric, the self-adhesive film and the needle felt are joined together, where the self-adhesive film touches the back of the fabric and the needle felt. The whole is heated so that the PES melt-adhesive film becomes sticky and is pressed together between two rollers. After cooling, the fabric and the needle felt are joined together by the self-adhesive film. The self-adhesive film forms an intermediate layer.

In one embodiment, a PES melt powder is used during lamination. The fabric is unwound from a first roll and the needle felt from a second roll. The PES melt powder is dispensed by means of a suitable dispenser through either the back side of the fabric or one side of the needle felt or the back side of the fabric and one side of the needle felt. The fabric and the needle felt are joined together, where the back side of the fabric faces the needle felt and the PES melt powder is between the fabric and the needle felt. This is heated so that the PES fusing powder becomes sticky and is pressed together between two rollers. After cooling, the fabric and the needle felt are joined together with the PES fusion powder. The PES fusion powder forms an intermediate layer.

In one embodiment, the lamination comprises the use of reactive molecules to form thermoreversible covalent interactions in the interlayer.

According to one embodiment, a composition comprising reactive molecules A is applied to the back side of the fabric. To a face of the needle felt, a composition comprising reactive molecules B is applied. The fabric and the needle felt are assembled, wherein the back side of the fabric and the side of the needle felt with the composition thereon touch each other and wherein the circumstances are such that the molecules A and B react and thus form thermoreversible covalent interactions. A thin intermediate layer is formed which connects the fabric and the needle felt.

According to another embodiment, a composition comprising reactive molecules B is applied to the back side of the fabric. To one side of the needle felt, a composition comprising reactive molecules B is also applied. The fabric and the needle felt are assembled, wherein the back side of the fabric and the side of the needle felt with the composition thereon are oriented towards each other. Between the fabric and the needle felt, a thin intermediate layer comprising reactive molecules A is applied. The circumstances are such that the molecules A and B react and thus form thermoreversible covalent interactions. The thin intermediate layer connects the fabric and the needle felt.

In one embodiment, the method comprises the further step prior to lamination of directing the backside of the fabric along a heated surface to at least partially melt some of the weft yarns at the backside of the machine-woven or mechanically woven fabric or with some of the warp yarns.

By increasing the temperature of the at least one heated surface, or as a result of the speed with which the fabric is directed along the heated surface, or as a result of, for example, the pressure with which the heated surface pushes against the backside of the fabric, it is possible to at least partially melt not only some of the warp threads, but also to at least partially melt some of the weft threads to the warp threads. This provides an even stronger fabric, in which the weft and warp threads are less mobile in relation to each other, which increases dimensional stability and reduces mutual friction and thus wear.

In a third aspect, the invention relates to the manufacture of a carpet according to the first aspect, using a method according to the second aspect.

It will be clear to the person skilled in the art that a carpet according to the present invention is suitable not only for use in aircraft, but also for use in other means of transport, such as for example trains and ships, where low weight, high wear resistance and the fact that it is hardly flammable, are required.

The present invention is now described in more detail with reference to the non-limiting examples or figures.

FIGURE DESCRIPTION

FIG. 1 shows a section of an embodiment of the present invention.

A polyester transport carpet comprises a needle felt 1, which is laminated to a smooth fabric 6 by means of an intermediate layer 2. The intermediate layer 2 comprises PES adhesive or reactive molecules to form thermoreversible covalent interactions. The smooth fabric 6 comprises a first group of warp threads 3 and a second group of warp threads 4. The warp yarns 3 and 4 are juxtaposed alternately in the longitudinal direction of the fabric. The smooth fabric 6 comprises weft threads 5. The weft threads 5 lie transversely to the direction of the warp threads 3 and 4. A first weft thread 5 lies below the warp threads 3 and above the warp threads 4. The next weft thread 5 then lies above the warp threads 3 and below the warp threads 4. The fabric is then built up in this way. The resulting bond is a flat bond. A weft repeat can be obtained in a similar way if groups of two warp threads 3 and groups of two warp threads 4 are juxtaposed alternately in the longitudinal direction of the fabric. Some of the warp threads 3 and 4 have at least partially fused to each other at the back side of the smooth fabric 6. This is shown in FIG. 1. Preferably, a part of the warp threads 3 and 4 have fused at least partially to the back side of the smooth fabric 6 with a part of the weft threads 5.

Figure 2:
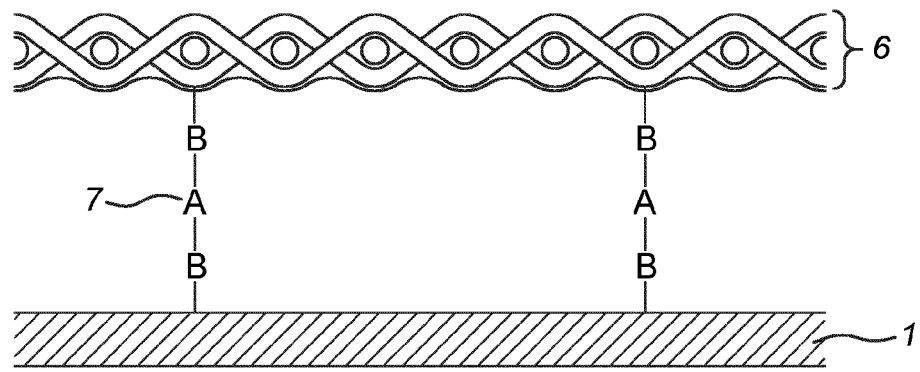
FIG. 2 shows schematically a molecular model of a bond between a fabric and a needle felt according to one embodiment of the present invention.

FIG. 2 shows schematically a molecular model of a bond between a fabric and a needle felt according to one embodiment of the present invention.

A composition comprising reactive molecules B is applied to the back side of the fabric 6 and to one side of the needle felt 1. The back side of the fabric 6 and the side with the applied composition comprising reactive molecules B on it of the needle felt 1 are brought together, with an intermediate layer with reactive molecules A between these sides. After the reaction between the molecules A and B has taken place, a bond 7 between the fabric 6 and the needle felt 1 is formed. The bond 7 makes use of the covalent interactions between the molecules A and B.

Figure 3:
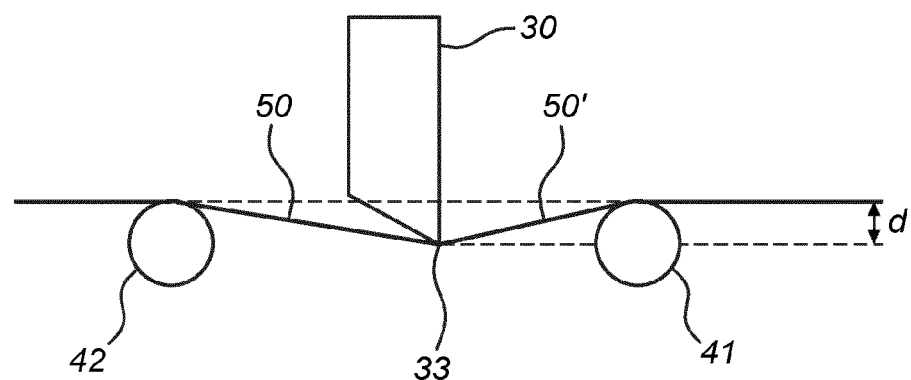
FIG. 3 shows a device suitable for at least partially fusing some of the warp threads to each other according to one embodiment of the method of the present invention.

FIG. 3 shows a device suitable for at least partially fusing some of the warp threads to each other according to one embodiment of the method of the present invention.

The fabric 50' is directed through support rolls 41 and 42. The direction is from support roller 41 to support roller 42. Between the two support rollers 41 and 42 is the heated surface 30. The heated surface pushes with a point 33 against the back side of the fabric 50'. Some of the warp threads have at least partially melted together on the back side of the fabric 50'. The melted warp threads are distributed to an essentially flat surface by the movement through the tip 33 of the heated surface 30. They then cool and form fabric 50, which is stronger, more dimensionally stable and more wear-resistant than fabric 50'.

The heated surface 30 can be moved over a distance d. This distance d is, for example, from 0 mm to 50 mm. By taking a distance d greater than 0 mm, the tip 33 of the heated surface 30 pushes against the back side of the fabric. The required distance d is determined by the desired result of at least partial melting of a part of the warp threads, together with the temperature of the heated surface 30 and its tip 33, the speed at which the fabric 50' is directed through the tip 33 and the fabric 50' itself. If a fabric 50' is not resistant to a large distance d, other variations of the parameters speed, distance d and temperature of the heated surface 30 and its tip 33 are possible to achieve the desired result.

Examples

The invention will now be described using, but not limited to, the following example.

The example relates to an embodiment of a polyester transport carpet, more particularly an aircraft carpet, according to the invention. The aircraft carpet comprises a smooth fabric, an intermediate layer and a needle felt.

Both the smooth fabric and the needle felt comprise 100% flame retardant PES. The middle layer contains a PES glue. Therefore, the aircraft carpet is 100% recyclable in a simple way after it has been replaced by a new aircraft carpet.

Needle felt is a non-woven textile. Velcro strips of the type HTH577 are glued to the aircraft floor. The many loose filament ends or loops in the needle felt are caught in the hooks of the Velcro tape. As a result, the aircraft carpet can be quickly installed in the aircraft, but also quickly replaced. The aircraft carpet simply has to be torn off the Velcro strips and the new aircraft carpet has to be adhered to the Velcro strip. There are no adhesive residues that need to be removed from the aircraft floor. There are no glue residues on the needle felt either, which simplifies recycling.

The fabric consists of warp and weft yarns with a yarn count of 2200 dtex. The yarns have an average breaking elongation of 30% and a minimum tensile strength of 3 g/den, tested according to ISO 2062. The average boil shrinkage of the yarns is, according to ISO 12590, 1.5%. There are 17 warp threads per cm of fabric and 5 weft threads per cm of fabric. This results in a strong fabric, which is also light. The weight of the fabric is limited to 570 $g/m^2$.

Some of the warp and weft threads have at least partially fused to each other on the back side of the fabric. This strengthens the fabric and increases the dimensional stability. The warp and weft threads are less mobile in relation to each other, which leads to less friction between the warp and weft threads and therefore also less wear and tear during the daily loading of passengers and trolleys. Because the fabric is stronger and has greater dimensional stability as a result of the at least partial melting of the warp and weft threads, it is not necessary to use glue to fix the knots between the warp and weft threads. The intermediate layer, comprising glue, is therefore lighter. The weight of the middle layer is limited to 130 $g/m^2$.

Needle felt is suitable for providing the necessary dimensional stability to the aircraft carpet. Needle felt is suitable for increasing the walking comfort of the passengers on the aircraft carpet and for sound insulation. Because the fabric is stronger as a result of at least partial melting of the warp and weft threads, the fabric already has a certain dimensional stability. Therefore, it is possible to use a thinner needle felt for the aircraft carpet. Needle felt has a maximum weight of 150 $g/m^2$. The total weight of a carpet is therefore 850 $g/m^2$.

The aircraft carpet was tested according to FAR 25.853 for flammability, specifically FAR 25.853(A)-App.f Part I para (a)(1)(ii) Measurement of flammability of aircraft material. The test was conducted in a draft-free cabinet in accordance with Federal Test Method Standard 191, Method 5903.2. Three 75 mm×305 mm aircraft carpet samples were exposed for 60 s to a Bunsen burner flame with a temperature of at least 843° C. The samples were suspended vertically in their longitudinal direction 20 mm above the tip of the Bunsen burner. The flame of the Bunsen burner has a height of 40 mm measured from the tip of the burner. The aircraft carpet then burned for a maximum average of 2 s over a length and width of less than 80 mm. There were no burning parts of the aircraft carpet falling off. Therefore, the aircraft carpet meets the standard, which requires that after removal of the flame, the carpet continues to burn for a maximum of 15 s, that the carpet burns for a maximum length of 152 mm and that burning parts of the carpet burn for a maximum of 5 s.

The aircraft carpet was subjected to a Vetterman test and a Lisson test. The Vetterman test simulates wear under laboratory conditions. The Lisson test determines the loss of mass and the bonding of fibres or threads, after the aircraft carpet has been subjected to a prescribed number of double passes of a quadruped wheel. In both tests, the aircraft carpet achieved the highest classification of 33, which means that it is suitable for heavy duty use. The aircraft carpet is suitable for the daily heavy load of passengers and trolleys.

The aeroplane carpet meets the ISO 6356 standard for the static electricity tendency of textile and laminate floor coverings.

The invention claimed is:

1. A flame-retardant carpet suitable for use inside means of transport, preferably aircraft, including:
    a mechanically woven fabric with a maximum weight of 650 $g/m^2$, comprising a front side as a use surface and a back side, comprising warp and weft yarns of essentially 100% thermoplastic flame retardant polyester (PES),
    a needle felt with a maximum weight of 220 $g/m^2$ of essentially 100% thermoplastic flame retardant polyester (PES),
    an intermediate layer between the needle felt and the mechanically woven fabric with a maximum weight of 180 $g/m^2$,
        wherein some of the warp threads on the back side of the mechanically woven fabric have at least partially fused to each other.

2. The carpet according to claim 1, wherein the thread number of the warp and weft threads is 1100 dtex to 4400 dtex.

3. The carpet according to claim 1, wherein the number of warp threads per cm of fabric is 8 to 30.

4. The carpet according to claim 1, wherein in that the number of weft threads per cm of fabric is 3 to 10.

5. The carpet according to claim 1, wherein the weight of the carpet is at most 950 $g/m^2$.

6. The carpet according to claim 1, wherein the mechanically woven fabric and the needle felt are laminated to each other with the aid of the intermediate layer.

7. The carpet according to claim 1, wherein the intermediate layer comprises a PES adhesive.

8. The carpet according to claim 1, wherein the carpet comprises reactive molecules for the formation of thermoreversible covalent interactions in the intermediate layer.

9. The carpet according to claim 1, wherein some of the weft yarns of the mechanically woven fabric has at least partially fused with some of the warp yarns.

10. A method for the manufacture of a flame-retardant carpet suitable for the interior of means of transport, preferably aircraft, comprising:
    the mechanical weaving of a fabric with a maximum weight of 650 $g/m^2$, comprising a front side as a use surface and a back side, comprising warp and weft yarns of essentially 100% thermoplastic flame retardant polyester (PES),
    the manufacture of a needle felt with a maximum weight of 220 $g/m^2$ of essentially 100% thermoplastic flame retardant polyester (PES),
    the lamination of the needle felt with a maximum weight of 180 $g/m^2$ to the fabric by means of an intermediate layer,
        wherein the method comprises the further step prior to lamination of directing the backside of the fabric along a heated surface to at least partially melt some of the warp threads at the backside of the mechanically woven fabric together.

11. The method according to claim 10, wherein the lamination comprises the use of PES as an adhesive in the intermediate layer.

12. The method according to claim 10, wherein the lamination comprises the use of reactive molecules to form thermoreversible covalent interactions in the interlayer.

13. The method according to claim 10, wherein the method comprises the additional step before lamination of directing the backside of the fabric along a heated surface to at least partially melt some of the weft yarns at the backside of the mechanically woven fabric with some of the warp yarns.

14. The manufacture of a carpet suitable for use inside means of transport, preferably aircraft, the carpet comprising:
   a mechanically woven fabric with a maximum weight of 650 g/m$^2$, comprising a front side as a use surface and a back side, comprising warp and weft yarns of essentially 100% thermoplastic flame retardant polyester (PES),
   a needle felt with a maximum weight of 220 g/m$^2$ of essentially 100% thermoplastic flame retardant polyester (PES),
   an intermediate layer between the needle felt and the mechanically woven fabric with a maximum weight of 180 g/m$^2$,
      wherein some of the warp threads on the back side of the mechanically woven fabric have at least partially fused to each other;
   the carpet made according to a method comprising:
      the mechanical weaving of a fabric with a maximum weight of 650 g/m$^2$, comprising a front side as a use surface and a back side, comprising warp and weft yarns of essentially 100% thermoplastic flame retardant polyester (PES),
      the manufacture of a needle felt with a maximum weight of 220 g/m$^2$ of essentially 100% thermoplastic flame retardant polyester (PES),
      the lamination of the needle felt with a maximum weight of 180 g/m$^2$ to the fabric by means of an intermediate layer,
      wherein the method comprises the further step prior to lamination of directing the backside of the fabric along a heated surface to at least partially melt some of the warp threads at the backside of the mechanically woven fabric together.

* * * * *